United States Patent
Drott et al.

[11] Patent Number: 5,979,293
[45] Date of Patent: Nov. 9, 1999

[54] VACUUM BRAKE POWER BOOSTER

[75] Inventors: Peter Drott, Frankfurt am Main; Horst Krämer, Dietzenbach, both of Germany

[73] Assignee: ITT Manufacturing Enterprises Inc., Wilmington, Del.

[21] Appl. No.: 08/930,157

[22] PCT Filed: Mar. 26, 1996

[86] PCT No.: PCT/EP96/01330

§ 371 Date: Dec. 22, 1997

§ 102(e) Date: Dec. 22, 1997

[87] PCT Pub. No.: WO96/33082

PCT Pub. Date: Oct. 24, 1996

[30] Foreign Application Priority Data

Apr. 19, 1995 [DE] Germany ............ 195 14 381

[51] Int. Cl.⁶ ............................................. F15B 9/10
[52] U.S. Cl. ........................................ 91/369.1; 91/376 R
[58] Field of Search ............... 91/369.1, 376 R; 92/96 R, 99

[56] References Cited

U.S. PATENT DOCUMENTS 5,460,074 10/1995 Balz et al. ................ 91/376 R
5,605,088 2/1997 Balz et al. ................ 91/376 R X

FOREIGN PATENT DOCUMENTS

| 0 379 329 | 7/1990 | European Pat. Off. |
| 3916639 | 11/1990 | Germany |
| 4238333 | 5/1994 | Germany |
| 4324688 | 1/1995 | Germany |
| 4338070 | 2/1995 | Germany |
| 4400688 | 2/1995 | Germany |
| 94/11226 | 5/1994 | WIPO |

OTHER PUBLICATIONS

Elektronisch Geregelter Bremskraftverstarker Von Josef Pickenhahn pp. 36–37, 1995.

Primary Examiner—Hoang Nguyen
Attorney, Agent, or Firm—Rader, Fishman & Grauer PLLC

[57] ABSTRACT

In a vacuum brake power booster for automotive vehicles, including a stationary booster housing and a control housing which is axially slidable with respect to the booster housing, a sealing ring, arranged between the booster housing and the control housing, has a stop for an actuating piston. The actuating piston is axially slidably mounted on the control housing, and its purpose is actuation of a release switch to release an electromagnetic actuation of the vacuum brake power booster.

6 Claims, 1 Drawing Sheet

VACUUM BRAKE POWER BOOSTER

BACKGROUND OF THE INVENTION

The present invention relates to a vacuum brake power booster for automotive vehicles.

German patent application No. 43 24 688 discloses a vacuum brake power booster for automotive vehicles, including a booster housing having an interior subdivided by a movable wall into a vacuum chamber and a working chamber, a control housing carrying the movable wall and accommodating a control valve which is operable by an actuating rod and governs a difference in pressure that acts upon the movable wall, and a solenoid which acts upon the control valve and permits ventilating the working chamber irrespective of the actuating rod.

An object of the present invention is to provide an improved vacuum brake power booster, wherein an actuating piston for the actuation of a release switch, which is used to release the solenoid, is arranged particularly favorably so as to achieve a simple and low-cost manufacture of the vacuum brake power booster.

SUMMARY OF THE INVENTION

This object is achieved in that, for operating a release switch which is used to release the solenoid, an actuating piston is paraxially slidably mounted at the edge of the control housing and provides a mechanical connection between the release switch in the vacuum chamber and a stationary stop in the working chamber.

Because the control housing, along with the solenoid and the release switch, is axially movable in the booster housing, a stationary stop is required to actuate the release switch by way of the actuating piston. According to the present invention, the stationary stop is arranged on a sealing ring interposed between the movable control housing and the stationary booster housing. Thus, the stop is independent of the shape or design of the booster housing in this area. This favorably eliminates the need to adapt the booster housing in a specific way for designing a stop. Straightforwardly, the sealing ring itself provides the stationary stop for the actuating piston.

In a preferred aspect of the present, the actuating piston has a slim connecting portion which extends through a bore in the control housing. This permits a simple mounting of the actuating piston on the control housing by easily inserting the slim connecting portion of the actuating piston from the inside in an outward direction through the bore in the control housing. Subsequently, the free end of the connecting portion is provided with an enlarged stop element which prevents the connecting portion and the entire actuating piston from slipping back into control housing. The end face of the stop element is used for abutment on the sealing ring provided between the booster housing and the control housing.

Further advantageous features are directed to improve the sealing effect at the point where the connecting portion extends through the bore in the control housing. Because the actuating piston provides a mechanical connection between the vacuum chamber and the working chamber, a corresponding sealing is required. Sealing can be effected by an annular lip seal which is slipped onto the connecting portion and abuts with a circumferential sealing lip on the connecting portion in a radial direction. In an axial direction, the lip seal abuts around the bore on the control housing. This axial abutment can still be improved if the actuating piston includes a helical wire spring, the one end of of which bears against the stop element, and the other end of which bears with axial preload against the lip seal.

To retain the actuating piston in the preassembled state on the control housing and to secure it against dropping out before the control housing is connected with other component parts and is installed on the booster housing, the actuating piston may have an enlarged retaining element on the inside of the bore of the control housing. The enlarged retaining element limits an axially outwardly directed movement of the actuating piston by abutment on the inside of the control housing.

If the actuating piston has an axially resiliently supported sleeve on its end facing the release switch, the sleeve ensures a compensation of axial manufacturing tolerances.

An embodiment of the present invention will be described in detail hereinbelow by way of the accompanying drawings.

DETAILED DESCRIPTION OF THE DRAWINGS

Figure 2:
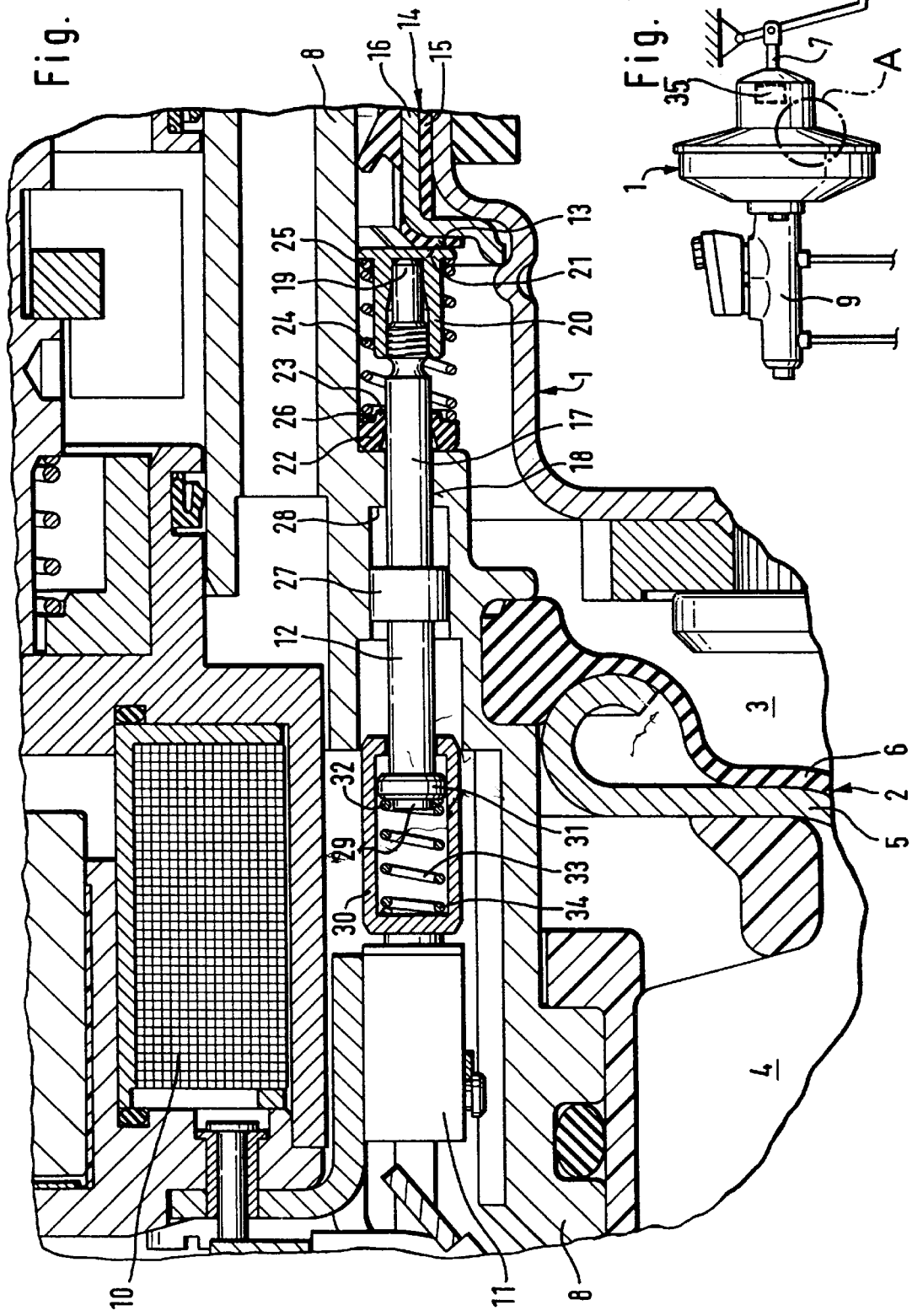
FIG. 2 is a cross-sectional view of the interior of the vacuum brake power booster as can be seen in excerpt A in FIG. 1.
Figure 1:
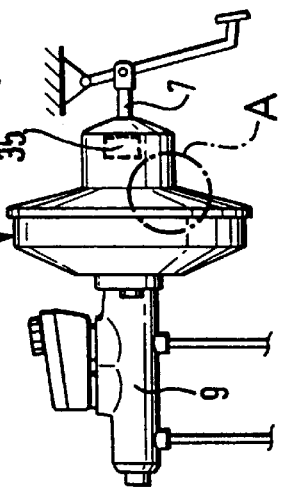
FIG. 1 is a schematic view of a vacuum brake power booster.

The booster housing 1 (shown only schematically) of the illustrated vacuum brake power booster according to the present invention is subdivided by an axially movable wall 2 into a working chamber 3 and a vacuum chamber 4. The axially movable wall 2 is made up of a sheet-metal deep-drawn diaphragm plate 5 and an abutting flexible diaphragm 6. Diaphragm 6 (not shown), configured as a rolling diaphragm, provides a sealing between the external periphery of the diaphragm plate 5 and the booster housing 1.

A control valve 35 (not shown in detail), operable by an actuating rod 7, is accommodated in a control housing 8. Control housing 8 is guided so as to be axially slidable and sealed in the booster housing 1. The movable wall 2 is attached to the control housing 8. The brake force is transmitted by way of the control housing 8 to a push rod (not shown). The push rod actuates the actuating piston of a master cylinder 9 (not shown in detail) of a brake system.

A solenoid 10 is provided to initiate an operation of the vacuum brake power booster of the present invention which is independent of the actuating rod 7. Solenoid 10 is used to operate the control valve 35 (not shown in detail). When the control valve 35 is operated by the solenoid 10, the working chamber 3 is acted upon by atmospheric pressure, with the result that the wall 2 is pressed in the direction of the vacuum chamber 4 and the actuating force applied to the master cylinder 9 is boosted in an emergency stop until the maximum possible value is reached.

A release switch 11 is used to terminate the emergency braking operation. Release switch 11 releases the solenoid 10 as soon as the actuating force applied to the actuating rod 7 is removed. To operate the release switch 11, an actuating piston 12 is paraxially slidably supported on the edge of the control housing 8. Piston 12 provides a mechanical connection between the release switch 11 in the vacuum chamber 4 and a stationary stop 13 in the working chamber 3.

To this end, the stationary stop 13 is provided on a sealing ring 14. The sealing ring 14 is made up of a rubber member 15 and a steel insert member 16. Ring 14, which is provided as a seal against the difference in pressure between the working chamber 3 and the vacuum chamber 4, is interposed radially between the stationary booster housing 1 and the axially movable control housing 8.

The actuating piston 12 has a slim connecting portion 17 that is passed through a bore 18 of the control housing 8. A free end 19 of the connecting portion 17 includes an enlarged stop element 20 which bears with its end face 21 against the sealing ring 14. Mounted on the connecting portion 17 is an annular lip seal 22 which abuts with a circumferential sealing lip 23 on the connecting portion 18 in a radial direction. In an axial direction, lip seal 22 abuts around the bore 18 on the control housing 8. A helical wire spring 24 is arranged around the connecting portion 17 and bears with its one end 25 against the stop element 20 and with its other end 26 against the lip seal 22 in an axially preloaded fashion.

The difference in pressure between the working chamber 3 and the vacuum chamber 4 has a self-boosting effect on the sealing forces at the lip seal 22. Both an axial press-on force in the direction of the bore 18 and a radial press-on force of the sealing lip 23 in the direction of the connecting portion 17 of the actuating piston 12 is thereby produced. Further, the lip seal 22 is floatingly supported so that the arrangement is relatively insensitive to manufacturing tolerances as regards alignment errors, off-center positioning, and similar conditions.

Further, the actuating piston 12 includes an enlarged retaining element 27 which is arranged on the inside of the bore 18 of the control housing 8. Retaining element 27 limits an axially outwardly directed movement of the actuating piston 12 by abutment on the inside 28 of the control housing 8. The end 29 of the actuating piston 12 facing the release switch 11 has an axially resiliently supported sleeve 30. Fitted to the end 29 of the actuating piston 12 is a stop ring 31 against which the one end 32 of a second helical wire spring 33 bears in an axially resilient manner. The other end 34 of the second wire spring 33 presses axially against the sleeve 30 in a direction of the release switch 11.

We claim:

1. A vacuum brake power booster for automotive vehicles, comprising:

a booster housing having an interior subdivided by a movable wall into a vacuum chamber and a working chamber;

control housing carrying the movable wall and accommodating a control valve which is operable by an actuating rod and governs a difference in pressure that acts upon the movable wall;

a solenoid which acts upon the control valve and permits ventilating the working chamber irrespective of a position of the actuating rod;

an actuating piston that is paraxially slidably mounted at the edge of the control housing to operate a release switch that releases the solenoid; and a sealing ring interposed between the movable control housing and the stationary booster housing, the sealing ring having a separate stationary stop in the working chamber, wherein the actuating piston provides a mechanical connection between the release switch in the vacuum chamber and the stationary stop.

2. The vacuum brake power booster as claimed in claim 1, wherein the actuating piston has a slim connecting portion that extends through a bore in the control housing, and wherein a free end of the connecting portion is provided with an enlarged stop element whose end face abuts against the stationary stop of the sealing ring.

3. The vacuum brake power booster as claimed in claim 2, wherein an annular lip seal is arranged on the connecting portion, abuts with a circumferential sealing lip on the connecting portion in a radial direction, and abuts around the bore on the control housing in an axial direction.

4. The vacuum brake power booster as claimed in claim 3, wherein the actuating piston includes a helical wire spring having one end that bears against the stop element and having another end that bears against the lip seal in an axially preloaded manner.

5. The vacuum brake power booster as claimed in claim 1, wherein the actuating piston has an enlarged retaining element on the inside of the bore in the control housing to limit an axially outwardly directed movement of the actuating piston by abutting against the inside of the control housing.

6. The vacuum brake power booster as claimed claim 1, wherein the actuating piston has an axially resiliently supported sleeve on an end facing the release switch.

\* \* \* \* \*

UNITED STATES PATENT AND TRADEMARK OFFICE
CERTIFICATE OF CORRECTION

PATENT NO. : 5,979,293
DATED : 11/09/99
INVENTOR(S) : Peter Drott and Horst Kramer It is certified that error appears in the above-identified patent and that said Letters Patent is hereby corrected as shown below:

In column 4, in claim 1, on line 1, please insert --a-- before "control".

In column 4, in claim 6, on line 42, please insert --in-- after "claimed"

Signed and Sealed this

Twenty-seventh Day of March, 2001

Attest:

NICHOLAS P. GODICI

Attesting Officer

Acting Director of the United States Patent and Trademark Office